United States Patent
Kshirsagar et al.

(10) Patent No.: US 10,554,418 B2
(45) Date of Patent: Feb. 4, 2020

(54) ROUTING CLOUD MESSAGES USING DIGITAL CERTIFICATES

(71) Applicant: General Electric Company, Schenectady, NY (US)

(72) Inventors: Atul Chandrakant Kshirsagar, San Ramon, CA (US); Vineet Banga, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 306 days.

(21) Appl. No.: 15/192,005

(22) Filed: Jun. 24, 2016

(65) Prior Publication Data

US 2017/0373860 A1 Dec. 28, 2017

(51) Int. Cl.
| | |
|---|---|
| *G06F 21/33* | (2013.01) |
| *H04L 9/32* | (2006.01) |
| *H04L 29/06* | (2006.01) |
| *H04L 29/08* | (2006.01) |
| *H04L 12/58* | (2006.01) |

(52) U.S. Cl.
CPC ............ *H04L 9/3268* (2013.01); *H04L 51/04* (2013.01); *H04L 63/0823* (2013.01); *H04L 67/02* (2013.01); *H04L 63/0281* (2013.01)

(58) Field of Classification Search
None
See application file for complete search history.

(56) References Cited

U.S. PATENT DOCUMENTS

| | | | |
|---|---|---|---|
| 8,707,420 B2 | 4/2014 | Gourevitch et al. | |
| 9,258,128 B1 * | 2/2016 | Tytula | H04L 9/3263 |
| 2002/0184501 A1 * | 12/2002 | Bin Abdul Rahman | |
| | | | H04L 63/0442 |
| | | | 713/173 |
| 2008/0086479 A1 * | 4/2008 | Fry | G06F 17/30575 |
| 2011/0131406 A1 * | 6/2011 | Jones | H04L 65/1053 |
| | | | 713/150 |
| 2012/0209968 A1 * | 8/2012 | Lawson | G06F 9/5072 |
| | | | 709/220 |
| 2013/0111558 A1 * | 5/2013 | Sangubhatla | G06F 21/44 |
| | | | 726/4 |

(Continued)

FOREIGN PATENT DOCUMENTS

WO 2015116609 A1 8/2015

*Primary Examiner* — Jason Chiang
(74) *Attorney, Agent, or Firm* — Buckley, Maschoff & Talwalkar, LLC

(57) ABSTRACT

Provided are a system and method for routing messages in a multi-tenant cloud computing environment based on digital certificates. In one example, a server includes a network interface configured to receive a request and a digital certificate from a network object, where the digital certificate includes a plurality of attributes. The server also includes a processor configured to determine whether the digital certificate is valid, and in response to determining the digital certificate is valid, detect tenant information from an attribute among the plurality of attributes included in the digital certificate. For example, the detected tenant information may identify a tenant of the multi-tenant cloud computing environment. The network interface may be further configured to transmit the request to the multi-tenant cloud computing environment based on the detected tenant information.

19 Claims, 5 Drawing Sheets

(56) References Cited

U.S. PATENT DOCUMENTS

| | | | |
|---|---|---|---|
| 2014/0101299 A1* | 4/2014 | Cherel | G06F 9/468 709/223 |
| 2014/0282997 A1* | 9/2014 | Norton | H04L 63/0807 726/10 |
| 2015/0180863 A1* | 6/2015 | Kobayashi | H04L 47/70 726/9 |
| 2015/0222643 A1 | 8/2015 | Sharif et al. | |
| 2015/0237157 A1* | 8/2015 | Wang | G06F 16/278 714/4.11 |
| 2015/0244707 A1* | 8/2015 | Bowen | H04L 63/0823 713/158 |
| 2016/0072904 A1* | 3/2016 | Asnis | H04L 63/0823 709/224 |
| 2017/0251076 A1* | 8/2017 | Bellur | H04L 67/322 |
| 2017/0300708 A1* | 10/2017 | Gopshtein | G06F 21/6218 |

\* cited by examiner

Digital certificates may contain one or more of the following fields about the entity being certified:

- The owner's public key
- The owner's Distinguished Name — 310
- The Distinguished Name of the CA that issued the certificate
- The date from which the certificate is valid
- The expiry date of the certificate
- The version number of the certificate data format (defined in X.509). The current version of the X.509 standard is Version 3, and most certificates conform to that version.
- A serial number. This is a unique identifier assigned by the CA which issued the certificate. The serial number is unique within the CA which issued the certificate: no two certificates signed by the same CA certificate have the same serial number.
- Issue Identifier
- Subject Identifier

| | |
|---|---|
| SERIALNUMBER | Certificate serial number |
| MAIL | Email address |
| E | Email address (MAIL) |
| UID or USERID<br>　↳Tenant ID —411 | User identifier　　　410 |
| CN<br>　↳Device ID or Service ID —421 | Common Name　　　420 |
| T | Title |
| OU | Organizational Unit name |
| DC | Domain component |
| O | Organization name |
| STREET | Street / First line of address |
| L | Locality name |
| ST (or SP or S) | State or Province name |
| PC | Postal code / zip code |
| C | Country |
| UNSTRUCTUREDNAME | Host name |
| UNSTRUCTUREDADDRESS | IP address |
| DNQ | Distinguished name qualifier |

FIG. 4

ROUTING CLOUD MESSAGES USING DIGITAL CERTIFICATES

FIELD

Exemplary embodiments described herein relate generally to cloud based systems and, more particularly, to systems and methods for routing messages in a multi-tenant cloud computing environment based on digital certificates used for authentication.

BACKGROUND

Multitenancy refers to an architecture where multiple independent clients (instances of one or more applications) operate in a shared environment such as a cloud platform. A tenant may refer to a collection of users that share common access to an instance of a software application, resource, and/or the like. In some cases, a tenant may refer to a representation or instance of an organization or enterprise that has access to a multi-tenant application. A tenant may also refer to an application from among a plurality of applications competing for shared underlying resources. The multiple tenants may be logically isolated but physically integrated. For example, the degree of logical isolation may be complete isolation while the degree of physical integration may vary. When devices and services (i.e., edges) communicate with applications in cloud, a message oriented middleware may be required to handle the complexity of routing communications to and from cloud, while maintaining isolation between different tenants. For example, the message oriented middleware may include hardware and/or software for sending and receiving messages to and from a distributed system. Examples of message oriented middleware for cloud computing include RabbitMQ, ActiveMQ, Kafka, and the like, and messaging protocols used by message oriented middleware include Advanced Message Queuing Protocol (AMQP), MQ Telemetry Transport (MQTT), and the like.

For cloud based messaging services in a multi-tenant environment it is critical to maintain logical separation among the multiple tenants. For example, clients belonging to different tenants should be able to create topics with the same name without any conflicts or cross talk. As an example, a client of one tenant subscribing to a topic should not see messages from a client of another tenant publishing to a topic with the same name. Prevention of conflicts is usually achieved by providing different endpoints to different tenants. With different endpoints one could route the requests (publish/subscribe) to different physical or logical clusters of message brokers in the cloud. For example, different endpoints could be provided in different forms such as different top level domains or sub domains. However, in this case, a cloud provider must register for these domains and make sure that requests to these domains/subdomains are routed to appropriate logical or physical clusters. This requires significant overhead in terms of managing the domain registrations.

As another example, different endpoints could be provided via a path element in a uniform resource locator (URL). This avoids overhead of the previously mentioned approach, however, this only works for those protocols that support the notion of path elements in their URL. For example, AMQP allows a user to specify a host in URL as a path but MQTT does not provide that support. Accordingly, this approach is not universally applicable for all messaging protocols. Another way cloud providers can achieve multi tenancy is by asking users to include some headers in their payload to indicate the tenancy. But again, this only works for some protocols (e.g., AMQP) that support custom headers but not for those protocols that don't support custom headers (e.g., MQTT).

Furthermore, even after establishing tenancy through one or more of the above described means, a user must still authenticate a device or a service attempting to access the cloud by using one or more of a variety of mechanisms including, but not limited to, basic authentication (username/password), X.509 certificate based authentication, challenge-response authentication, and the like.

BRIEF DESCRIPTION OF THE DRAWINGS

Features and advantages of the exemplary embodiments, and the manner in which the same are accomplished, will become more readily apparent with reference to the following detailed description taken in conjunction with the accompanying drawings, in which:

FIG. 3 is a diagram illustrating a list of fields that may be included in a digital certificate in accordance with an example embodiment.

FIG. 4 is a diagram illustrating a list of attributes that may be included in a field of a digital certificate in accordance with an example embodiment.

Figure 1:
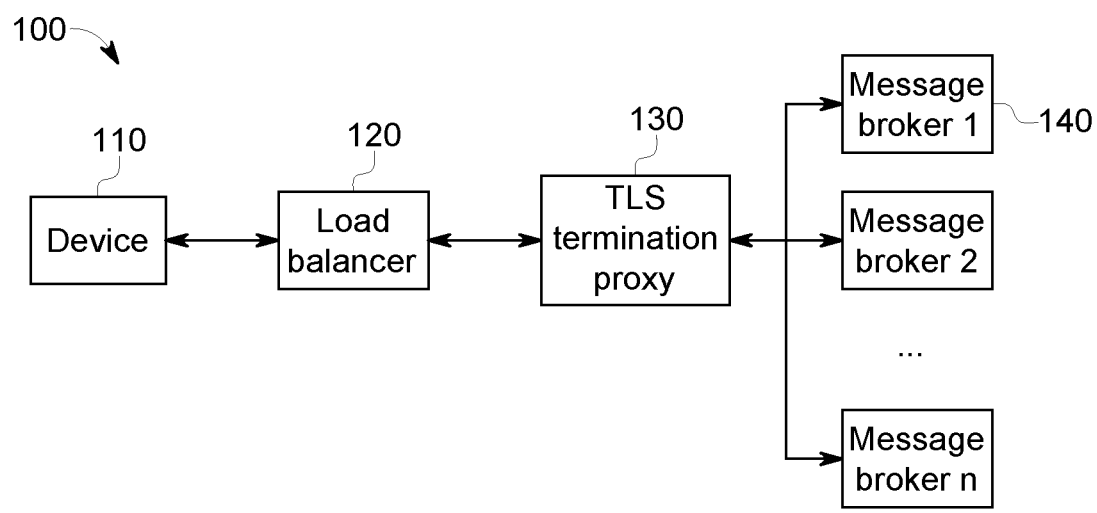
FIG. 1 is a diagram illustrating an example of a multi-tenant cloud computing system in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various exemplary embodiments. It should be appreciated that various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The exemplary embodiments relate to routing messages between a network object (e.g., a service, a device, an application, and the like) and a multi-tenant cloud computing environment based on data included in a digital certificate of the network object. In the examples herein, a tenant may refer to a group of users that share a common access with specific privileges to a software instance in the cloud. With a multitenant architecture, a software application is designed to provide every tenant a dedicated share of the instance including its data, configuration, user management, tenant individual functionality and non-functional properties. In a multi-tenant cloud computing environment, it is necessary to logically isolate individual tenants in the cloud from one another to prevent cross talk and other problems. Therefore, it is necessary to route messages to and from respective tenants without messages being sent to a wrong tenant inadvertently.

According to various aspects, tenancy information of a network object may be extracted during an authentication process using a digital certificate and may be compatible with all types of messaging protocols such as AMQP, MQTT, and the like. In some examples, information contained in one of the attributes of a digital certificate may be used for determining tenancy of the network object and another attribute may be used to determine the identity of the network object that owns the digital certificate. In these examples, the tenancy information of the network object may be detected from the digital certificate by a uniform endpoint for a plurality of network objects thereby avoiding the need for additional overhead that is required when sending messages from a network object to the cloud computing environment.

Digital certificates may be used in a network environment, such as a cloud computing multi-tenant network environment or another network environment. In these environments, a digital certificate may be used to authenticate credentials of a sender thereby insuring the recipient of an encrypted message that the data is from a trusted source. A digital certificate is typically issued by a certification authority (CA). The most common digital certificate standard is X.509. A network object (e.g., a service or a device) may request a digital certificate by communicating a Certificate Signing Request (CSR) to the CA. The CA may perform identity and other verification of the requesting customer entity such as the domain name of the customer entity, identity of an officer of the customer entity requesting the certificate, customer entity address, authenticity of a public key of an asymmetric public-private key pair of the customer entity, and the like. In this regard, the CA may require proof of ownership of the domain and identity of the domain owner (e.g., the customer entity) as well as the identity of the corporate office requesting the certificate.

Once the CA has completed the authentication process, the CA may issue a digital certificate associating the requesting customer entity with the public key. The digital certificate may also be cryptographically signed by the issuing CA (e.g., using a private key of the CA), and can be traced through a hierarchy of CAs to a CA which is known and trusted. In most examples, a digital certificate has an expiration date, at which point the customer entity may need to apply again for reissuing the certificate. After issuance, the digital certificate can be used in the cloud computing multi-tenant network environment, as well as other Internet-based communications, to establish the identity of the customer entity and/or authenticity of one or more web sites or other network resources or services associated with the customer entity. In the case of a multi-tenant computing environment, the digital certificate may be used to establish a link between an edge and a tenant in the cloud to enable the edge to publish and subscribe messages to and from the tenant.

FIG. 1 illustrates a multi-tenant cloud computing system 100 in accordance with an example embodiment. Referring to FIG. 1, the system 100 includes a device 110, a load balancer 120, a proxy server 130, and a plurality of message brokers 140. The device 110 may be a computing device, a sensor, a machine, and the like, and may correspond to a user belonging to a tenant included in the multi-tenant cloud computing system 100. Here, the system 100 may act as a gateway between the device 110 and a cloud computing environment in an Internet-of-things (Iot) based network such as those used in a smart city, and the like. In FIG. 1, the device 110 is used for convenience of explanation, however, it should also be appreciated that the device may be another network object such as a service, an application, and the like. The device 110 may establish a connection to an application in the cloud through a message broker 140. For example, the message broker 140 may serve a tenant of which the device 110 belongs enabling the device 110 to transmit and receive messages to and from the application in the cloud. Once connected, data captured by the device 110 may be transmitted to the cloud through the load balancer 120, the proxy server 130, and the message brokers 140, where it may be analyzed, stored, and the like, by the application in the cloud. The load balancer 120 may be used to distribute workloads among computing resources possibly spread across multiple availability zones to provide high availability. The proxy server 130 may route messages from the device 110 to the message brokers 140 based on routing information. In the example of FIG. 1, the proxy server 130 is shown separately for convenience of description. As another example, the proxy server 130 may be included in the load balancer 120, in the message brokers 140, and the like.

According to various example embodiments, the proxy server 130 may detect tenancy information of the device 110 from a digital certificate of the device 110. For example, the device 110 may transmit a request to the proxy server 130 through the load balancer 120. In response, the proxy server 130 may request and receive a digital certificate from the device 110 in order to authenticate the device 110. The proxy server 130 may validate the digital certificate, for example, based on an expiration date, a certification authority (CA), and the like. In the examples described herein, the proxy server 130 may also determine a corresponding message broker 140 with which to send the request based on tenancy information of the network object extracted from the digital certificate. That is, the proxy server 130 may transmit a request received from the device 110 to a corresponding message broker 140 based on the tenancy information detected from the digital certificate. According to various aspects, the system 100 may be a publish/subscribe based system in which the device 110 may post (i.e., publish) messages to an intermediary (i.e., a message broker 140), and the device 110 may register subscriptions (i.e., subscribe) with the message broker 140, letting the message broker 140 perform the filtering. The message broker 140 may perform a store and forward function to route messages from publishers to subscribers. In addition, the message broker 140 may prioritize messages in a queue before routing. In the example of FIG. 1, a link between the device 110 and the cloud may be established by establishing a link between the device 110 and a corresponding message broker 140 thereby enabling the device 110 to publish messages to the cloud and subscribe to messages from the cloud via the respective message broker 140.

As a non-limiting example, the device 110 may be a street light having one or more sensors attached thereto for capturing sensor data such as pedestrian count across a crosswalk, occupancy of a parking space, audio/video capture, and the like. The street light may correspond to a user that belongs to a particular tenant. Such a scenario may be deployed to multiple cities and the street lights in each respective city may belong to different respective tenants in the multi-tenant cloud computing system 100. In this case, interference or crosstalk causing significant problems may occur if messages from one city were to be consumed by devices/services for another city. Also, because these edge devices (street lights) are deployed on the street, security is critical. In this case, client certificate based authentication may provide a robust and tamper proof way of authenticating communications from the street light. Furthermore, according to various embodiments, based on tenancy information included in the digital certificate used for the client authentication, the messages may be routed to the appropriate message broker within the cloud that serves that tenant. It should also be appreciated that the street light is merely an example. As another example, locomotives belonging to separate operators (i.e., tenants) may securely send telemetry data to the cloud based on a digital certificate of the locomotive, windmills belonging to separate wind farm operators (i.e., tenants) can securely send telemetry data to the cloud based on a digital certificate of the windmill, and the like. In these cases, tenant routing information may be extracted from the digital certificates and used to route the messages to the cloud.

A message broker 140 may be used to transmit messages from the device 110 to subscribers belonging to a tenant and transmit message from publishers belonging to a tenant to the device 110. A plurality of tenants may exist in the cloud and the tenants may be similar or they may be different from one another. The message brokers 140 may be used to route messages to and from the multiple tenants. In one example, each message broker 140 may route messages to a respective subscriber (device or application in cloud) belonging to a tenant. Also, the message broker 140 may receive messages from a plurality of tenants (i.e., multi-tenant) and route the messages within the cloud. That is, the message brokers 140 may receive and deliver messages to and from applications in the cloud, and may allow clients (e.g., services and devices) to effectively and safely deliver information to the applications. In some cases, a message broker 140, may route messages to one or more destinations, store and forward messages allowing durable subscriptions, and transform messages from one protocol to other. The message brokers 140 may allow clients to connect over a range of different standardized protocols such as AMQP, MQTT, HTTPS, STOMP, and the like. Accordingly, the messages and/or requests described herein are not limited to a specific protocol and may include any known cloud messaging protocol.

Figure 2:
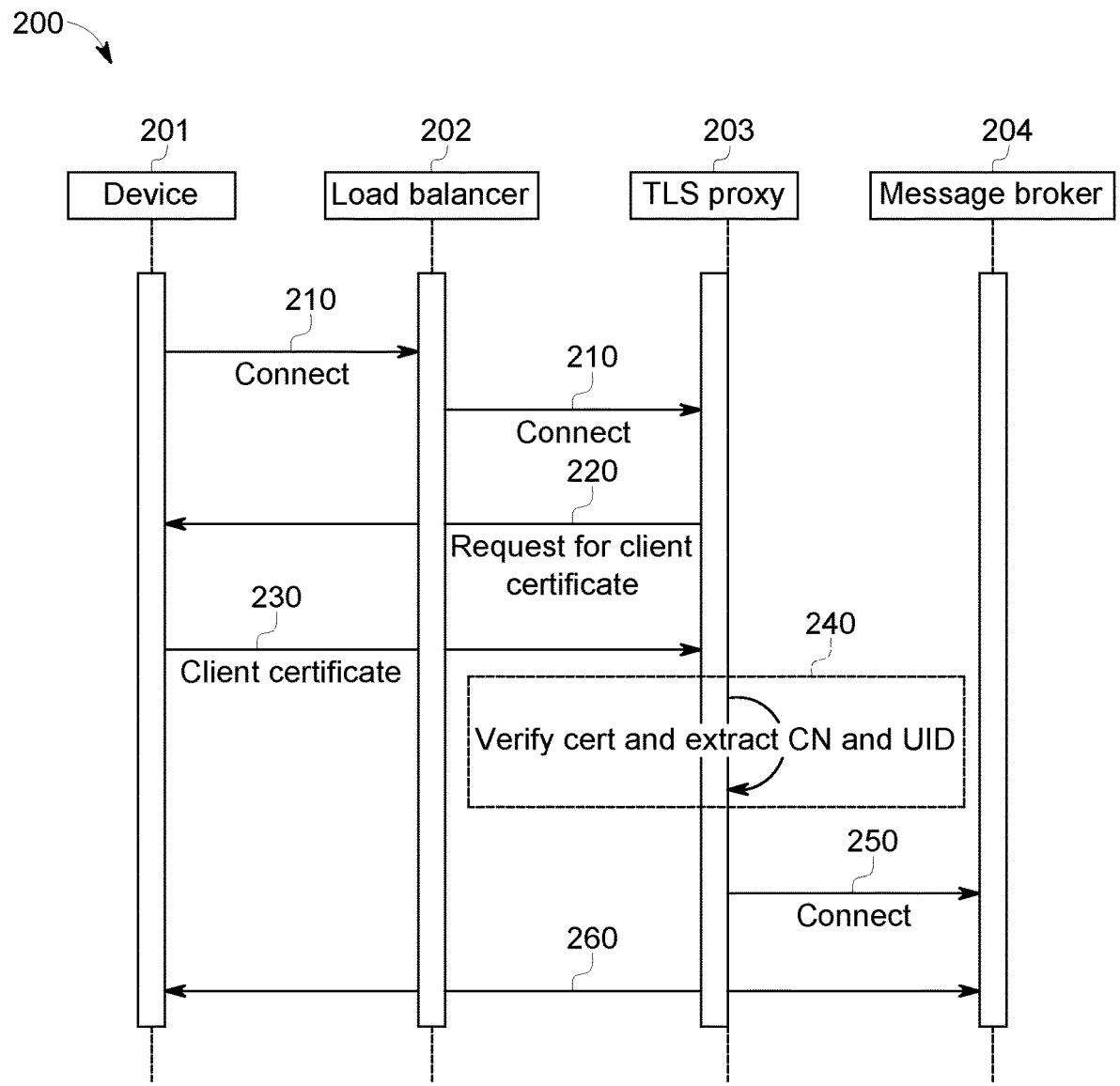
FIG. 2 is a diagram illustrating a message sequence in a multi-tenant cloud computing system in accordance with an example embodiment.

FIG. 2 illustrates a message sequence in a multi-tenant cloud computing system 200 in accordance with an example embodiment. Referring to FIG. 2, the system 200 includes a device 201, a load balancer 202, a Transport Layer Security (TLS) proxy server 203, and a message broker 204. In this example, the device 201 is attempting to connect to the message broker 204 to transmit and receive (publish and subscribe) messages in a cloud computing environment. Here, the device 201 may include a micro controller, a server, a computing device, a sensor, and the like. The device 201 may belong to a tenant and in some cases may be capable of publishing and subscribing within the system 200. The message broker 204 may receive messages from device 201, filter the messages, and decide what other devices/services (i.e., users belonging to a tenant) are interested in the messages. Accordingly, the message broker 204 may transmit the messages to the interested subscribers belonging to a respective tenant within the cloud. The message broker 204 may also be responsible for authenticating the device 201 based on a digital certificate provided by the device 201. As another example, the TLS proxy server 203 may authenticate the device 201 based on a digital certificate provided by the device. For example, one or more of the TLS proxy server 203 and the message broker 204 may store a root certificate of a CA which may be used to authenticate a digital certificate provided to the device 201 by the CA.

In this example, in 210 a connection to the cloud is initiated by the device 201 sending a connection (e.g., CONNECT) request to the message broker 204 through the TLS proxy server 203 and the load balancer 202. Here, the connection request may be part of an authentication process such as a two-way TLS handshake for establishing or re-establishing a connection between the device 201 and the cloud. The connection request may have fields such as one or more of a client ID, clean session, username, password, last topic, last QoS, last message, keep alive, and the like. The load balancer 202 may receive the connection request and transmit the request to the proxy server 203. In response, in 220 the TLS proxy server 203 may send a request to the device 201 for a digital certificate. In 230, the device 201 may provide the TLS proxy server 203 with the device's 201 digital certificate. In 240, the TLS proxy server 203 may validate the certificate based on a root certificate of a CA, an expiration date, and the like. In response to determining the digital certificate is valid, the TLS proxy server 203 may further detect tenant information from an attribute among a plurality of attributes included in the digital certificate, in 240. In this case, the detected tenant information may identify a tenant included in the multi-tenant cloud computing environment. Examples of detecting tenant information are provided in the description of FIGS. 3 and 4. Based on the detected tenant information, in 250 the TLS proxy server 203 may transmit the previously received connection request to the message broker 204.

In the example of FIG. 2, the initial message and the digital certificate received from the device 201 may be the result of a two-way transport layer security (TLS) authentication process. According to various aspects, the tenancy information of the device 201 may be extracted from the digital certificate during the authentication process thereby combining the authentication process with the tenancy determination process, thus improving the efficiency of the system 200 in comparison to a traditional messaging service. In this example, the TLS proxy server 203 may act as a common endpoint for many devices and/or services (from multiple tenants) transmitting connection requests to the cloud. Tenancy information may be detected from a digital certificate by the TLS proxy server 203 for each of a plurality of services/devices thereby avoiding the need for additional overhead that may be required when sending messages to the cloud computing environment.

FIG. 3 illustrates a list of fields that may be included in a digital certificate 300 in accordance with an example embodiment. The digital certificate 300 may be based on an X.500 computer networking standard, for example, an X.509 digital certificate, and the like, and may be provided to a device, service, application, and the like, from a certificate authority (CA). Referring to FIG. 3, the digital certificate 300 may include an owner's public key, owner's Distinguished Name 310, Distinguished Name of the CA, validity date, expiration date, version number, serial number, issue identifier, subject identifier, and the like. The owner may refer to a holder of the digital certificate such as the device 110 shown in FIG. 1, or another device or entity. The digital certificate 300 may be used in a Transport Layer Security protocol authentication used to secure web and email communication. As one example, the digital certificate 300 may be included in a cloud-based message originating from a device/service and transmitted to a cloud storage environment via a message broker, and the like, such as between the device 110 and the message broker 140 shown in FIG. 1. According to various example embodiments, the Distinguished Name field 310 may include tenant information about a tenant within a multi-tenant cloud computing environment.

FIG. 4 illustrates a list of attributes 400 that may be include in the Distinguished Name field 310 of the digital certificate 300 shown in FIG. 3. In this example, the left side of the list 400 includes the attributes that may be include in the Distinguished Name 310 and the right side of the list 400 includes a brief description of each respective attribute. Referring to FIG. 4, the list 400 of attributes may include a serial number, an email address, a user identifier 410, a common name 420, a title, an organizational unit name, a domain component, an organization name, an address (e.g., street name, number) of the organization, a locality name, a state or province name, a postal code, a country, a host name, an IP address, a distinguished name qualifier, and the like. According to various aspects, the user identifier (UID or USERID) attribute 410 may include a tenant ID field 411 including a name, number, string, and the like, identifying a tenant within a multi-tenant cloud computing environment. The Common Name attribute 420 may include a Device ID/Service ID 421 identifying the sender/owner of the digital certificate. A routing device (such as a proxy server 130) may receive a message/request from a device/service and the digital certificate 300 corresponding to the device/service, detect or otherwise extract the tenant ID 411 from the digital certificate, and route the message/request to a message broker in the multi-tenant cloud computing environment. In some examples, the routing device may further extract the DeviceID/ServiceID 421 from the digital certificate and provide that to the message broker along with the message/request. For example, the routing device may include the DeviceID/ServiceID 421 within the message/request that is transmitted to the cloud computing environment.

Figure 5:
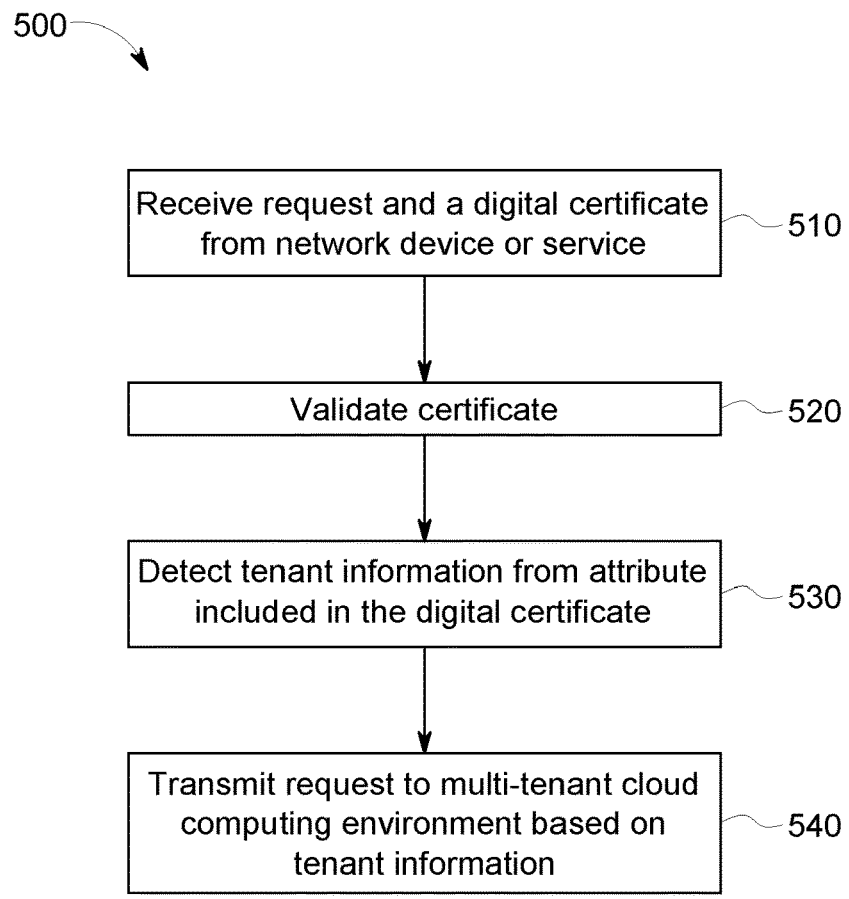
FIG. 5 is a diagram illustrating a method for determining tenancy information in a multi-tenant cloud computing environment in accordance with an example embodiment.

FIG. 5 illustrates a method 500 for determining tenancy information in a multi-tenant cloud computing environment in accordance with an example embodiment. Referring to FIG. 5, in 510, the method includes receiving a request and a digital certificate including a plurality of attributes from a network object. For example, the request and the digital certificate may be received at the same time (e.g., simultaneously), or the request and the digital certificate may be received at differing times. In 520, the method includes validating the digital certificate. For example, a CA, an expiration date, and the like, of the digital certificate may be validated based on previously stored information. In response to determining the digital certificate is valid, in 530 the method includes detecting tenant information of the network object from an attribute among the plurality of attributes included in the digital certificate. The detected tenant information may identify a tenant included in the multi-tenant cloud computing environment to which the network object belongs. For example, the detected tenant information may be a tenant ID detected from an attribute included in a Distinguished Name field of the digital certificate. The method further includes transmitting the request to the multi-tenant cloud computing environment based on the detected tenant information, in 540. For example, the transmitting in 540 may include transmitting the request to a message broker, from among a plurality of message brokers in the multi-tenant cloud computing environment, based on the tenant ID extracted from the digital certificate.

In this example, the detecting in 530 may include detecting the tenant information from a Distinguished Name (DN) field of the digital certificate that uniquely identifies the network object. As an example, the digital certificate may be based on an X.509 public key infrastructure (PKI) standard for performing certificate based authentication, and the detecting the tenant information comprises detecting a tenant ID that is stored in a user identification (UID) attribute of the X.509 digital certificate. In some examples, the detecting in 530 may further include detecting an ID of the network object from another attribute included in the digital certificate, and the transmitting in 540 may include transmitting the detected ID of the network object to the multi-tenant cloud computing environment along with the request.

Figure 6:
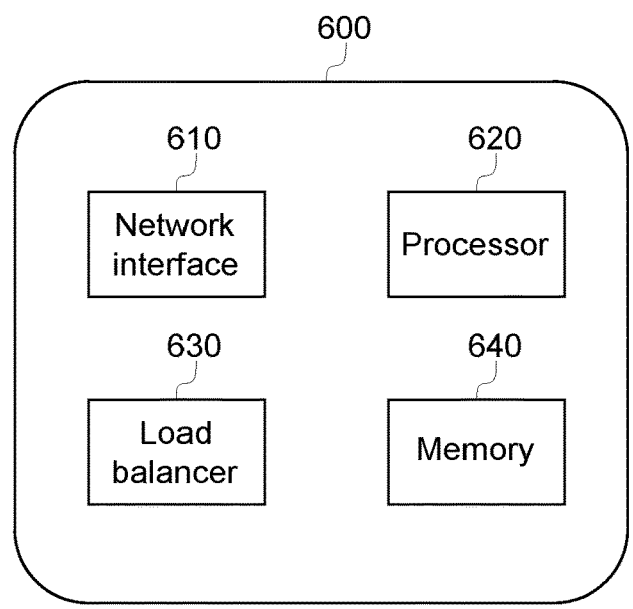
FIG. 6 is a diagram illustrating a device for determining tenancy information in a multi-tenant cloud computing environment in accordance with an example embodiment.

FIG. 6 illustrates a device 600 for determining tenancy information in a multi-tenant cloud computing environment in accordance with an example embodiment. For example, the device 600 may correspond to the proxy server 130 shown in FIG. 1, and may perform the method 500 shown in FIG. 5. Referring to FIG. 6, the device 600 includes a network interface 610, a processor 620, a load balancer 630, and a memory 640. Although not shown in FIG. 6, the device 600 may include other features, for example, an input unit, a transmitter, a receiver, a display, and the like. The network interface 610 may transmit and receive data over a network such as the Internet. The processor 620 may include a single core processing device, a multicore processing device, or multiple processing devices. The processor 620 may control the overall operations of the device 600. The load balancer 630 may determine how to distribute workloads across multiple computing resources in a cloud computing environment. The memory 640 may store certificate based authentication information such as root certificates, and may include any desired memory, for example, random access memory (RAM), one or more hard disks, cache, hybrid memory, an external memory, flash memory, and the like.

The network interface 610 may receive a request and a digital certificate from a network object. For example, the network object may include a service, a device, an application, a program, and the like. The request may include a request from the network object to connect to a message broker in the cloud computing environment. The digital certificate may include a plurality of fields, and at least one of the fields may include a plurality of attributes. The processor 620 may determine whether the digital certificate is valid, for example, based on data stored in the memory 640. In response to determining the digital certificate is valid, the processor 620 may detect tenant information from an attribute among a plurality of attributes included in the digital certificate. For example, the tenant information may be detected from a UID attribute of a Distinguished Name field of the digital certificate. The detected tenant information may identify a tenant of the multi-tenant cloud computing environment to which the network object belongs. The network interface 610 may transmit the request from the network object to the multi-tenant cloud computing environment based on the detected tenant information. For example, the network interface 610 may transmit the request to a message broker from among a plurality of message brokers of the multi-tenant cloud computing environment based on the detected tenant information, to establish a connection between the network object and the message broker. In some examples, the processor 620 may further detect an ID of the network object from another attribute included in the digital certificate, and the network interface 610 may transmit the detected ID of the network object to the multi-tenant cloud computing environment along with the request.

According to various example embodiments, described herein is a system and method for routing messages in a multi-tenant cloud computing environment based on data included in a digital certificate. For example, an identity of a sender (e.g., service or device) and a tenant to which the sender belongs may be extracted from attributes included in a field of the digital certificate. Accordingly, routing information may be extracted during an authentication process between a service/device and the cloud.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A server in a cloud computing environment, the server comprising:
    a hardware network interface configured to receive an authentication request including a digital certificate from a network object on an edge of the cloud computing environment, the digital certificate comprising a tenant identifier stored within a predefined attribute from among a plurality of predefined attributes of a Distinguished Name of the digital certificate; and
    a processor configured to determine whether the digital certificate is valid, and in response to determining the digital certificate is valid, identify a message broker of a tenant of the multi-tenant cloud computing environment based on the tenant identifier included in the predefined attribute of the Distinguished Name of the digital certificate, and establish a link between the network object on the edge and the message broker of the tenant within the multi-tenant cloud computing environment identified based on the tenant identifier stored in the digital certificate,
    wherein the network interface is further configured to transmit the request to the message broker via the established link.

2. The server of claim 1, wherein the processor is configured to detect the tenant information from a tenant ID field included in the predefined attribute of the Distinguished Name of the digital certificate.

3. The server of claim 1, wherein the digital certificate comprises an X.509 public key infrastructure (PKI) digital certificate for performing certificate based authentication, and the processor is configured to detect, as the tenant information, a tenant ID that is stored in a predefined user identification (UID) attribute of a Distinguished Name of the X.509 digital certificate.

4. The server of claim 1, wherein the processor is further configured to detect an ID of the network object from another predefined attribute from among the plurality of predefined attributes included in the Distinguished Name of the digital certificate, and the network interface is configured to transmit the detected ID of the network object to the message broker within the multi-tenant cloud computing environment along with the request.

5. The server of claim 1, wherein the network object comprises an industrial system on the edge connected to the server via the Internet.

6. The server of claim 1, wherein the server comprises a transport layer security (TLS) proxy server, and the request comprises a connection request for connecting the network object to the message broker within the multi-tenant cloud computing environment.

7. The server of claim 1, wherein the processor is configured to establish a publish/subscribe relationship between the edge and the cloud computing environment based on the authentication request by establishing a link between the network object and the message broker based on the tenant identifier stored within the digital certificate.

8. The server of claim 1, wherein the message broker serves the tenant identified from the tenant identifier in the digital certificate, and the established link enables the network object to publish data to and subscribe to data from a cloud application of the tenant via the message broker.

9. A method of a server in a cloud computing environment, the method comprising:
    receiving an authentication request including a digital certificate from a network object on an edge of the cloud computing environment, the digital certificate comprising a tenant identifier stored within a predefined attribute from among a plurality of predefined attributes of a Distinguished Name of the digital certificate;

determining whether the digital certificate is valid;

in response to determining the digital certificate is valid, identify a message broker of a tenant of the multi-tenant cloud computing environment based on the tenant identifier included in the digital certificate;

establishing a link between the network object on the edge and the message broker of the tenant within the multi-tenant cloud computing environment identified based on the tenant identifier stored in the predefined attribute of the Distinguished Name of the digital certificate; and transmitting the request to the message broker via the established link.

10. The method of claim 9, wherein the detecting comprises detecting the tenant information from a tenant ID field included in the predefined attribute of the Distinguished Name of the digital certificate.

11. The method of claim 9, wherein the digital certificate comprises an X.509 public key infrastructure (PKI) digital certificate for performing certificate based authentication, and the detecting the tenant information comprises detecting a tenant ID that is stored in a predefined user identification (UID) attribute of a Distinguished Name of the X.509 digital certificate.

12. The method of claim 9, wherein the detecting further comprises detecting an ID of the network object from another predefined attribute from among the plurality of predefined attributes included in the Distinguished Name of the digital certificate, and the transmitting comprises transmitting the detected ID of the network object to the message broker in the multi-tenant cloud computing environment along with the request.

13. The method of claim 9, wherein the network object comprises an industrial system on the edge connected to the server via the Internet.

14. The method of claim 9, wherein the server comprises a transport layer security (TLS) proxy server, and the request comprises a connection request for connecting the network object to the message broker within the multi-tenant cloud computing environment.

15. A non-transitory computer readable medium storing instructions that when executed cause a computer to perform a method of a server in a cloud computing environment, the method comprising:

receiving an authentication request including a digital certificate from a network object on an edge of the cloud computing environment, the digital certificate comprising a tenant identifier stored within a predefined attribute from among a plurality of predefined attributes of a Distinguished Name of the digital certificate;

determining whether the digital certificate is valid;

in response to determining the digital certificate is valid, identifying a message broker of a tenant of the multi-tenant cloud computing environment based on the tenant identifier included in the predefined attribute of the Distinguished Name of the digital certificate;

establishing a link between the network object on the edge and the message broker of the tenant within the multi-tenant cloud computing environment identified based on the tenant identifier stored in the digital certificate; and transmitting the request to the message broker via the established link.

16. The non-transitory computer readable medium of claim 15, wherein the detecting comprises detecting the tenant information from a tenant ID field included in the predefined attribute of the Distinguished Name of the digital certificate.

17. The non-transitory computer readable medium of claim 15, wherein the digital certificate comprises an X.509 public key infrastructure (PKI) digital certificate for performing certificate based authentication, and the detecting the tenant information comprises detecting a tenant ID that is stored in a predefined user identification (UID) attribute of a Distinguished Name of the X.509 digital certificate.

18. The non-transitory computer readable medium of claim 15, wherein the detecting further comprises detecting an ID of the network object from another predefined attribute from among the plurality of predefined attributes included in the Distinguished Name of the digital certificate, and the transmitting comprises transmitting the detected ID of the network object to the message broker within the multi-tenant cloud computing environment along with the request.

19. The non-transitory computer readable medium of claim 15, wherein the network object comprises an industrial system connected to the server via the Internet.

* * * * *